June 14, 1966 — B. KAN — 3,255,534

VACUUM APPARATUS

Filed March 21, 1963

INVENTOR.
BILLY KAN

United States Patent Office 3,255,534
Patented June 14, 1966

3,255,534
VACUUM APPARATUS
Billy Kan, Newton, Mass., assignor, by mesne assignments, to United Fruit Company, Boston, Mass., a corporation of New Jersey
Filed Mar. 21, 1963, Ser. No. 266,874
13 Claims. (Cl. 34—5)

The present invention relates to the removal of water from frozen products such as food and pharmaceuticals, by the process of freeze drying. A principal limitation on commercial usage of this drying process is the long time required in drying cycles.

A substantial reduction in cycle times for freeze drying is achieved by the techniques described in the copending application of deBuhr S.N. 268,852, filed March 11, 1963. In accord with such techniques a dry inert gas is periodically pulsed into the drying chamber whereby the total pressure in the chamber is periodically raised and lowered.

The objects of the present invention are to provide an improvement on the techniques of deBuhr which will make possible further reduction in drying time, reduce costs related to the usage of dry gas and comprise a simple and economical freeze drying apparatus adapted to commercial usage.

Other objects of the invention will in part be obvious and will in part appear hereinafter.

The invention accordingly comprises the apparatus possessing the features, properties and relation of parts exemplified in the following detailed disclosure and the scope of the application of which will be indicated in the claims.

Figure 1:
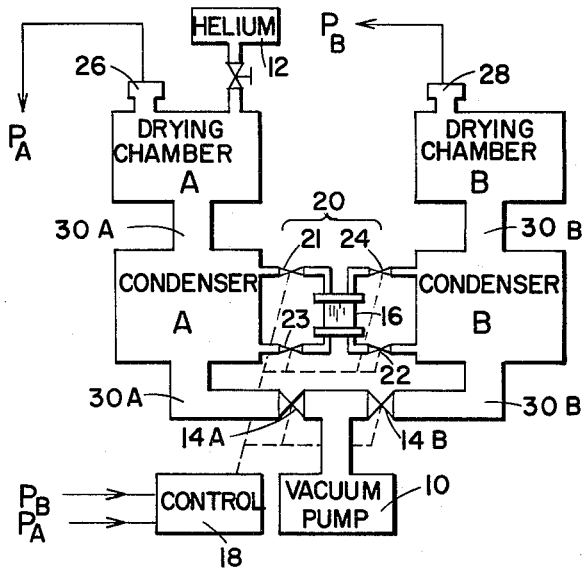
Figure 2:
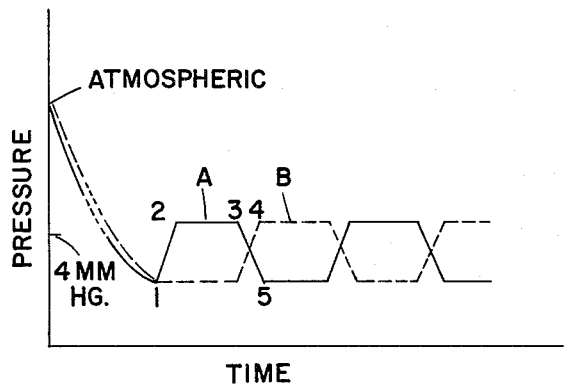

For a fuller understanding of the nature and objects of the invention, reference should be had to the following detailed description taken in connection with the accompanying drawings wherein:

FIG. 1 is a schematic view of apparatus arranged in accord with the invention; and FIG. 2 is a pressure-time curve showing the operation of the apparatus of FIG. 1.

Referring now to FIG. 1 there is shown a freeze drying apparatus comprising a drying chamber A connected to a vacuum pump 10 via a passage 30A. A refrigerated condenser A is connected to the passage in a series with the drying chamber to reduce the vapor tension of ice in the product to be dried. Similarly, a drying chamber B is connected to the pump via a passage 30B and condenser B.

Chamber A is provided with a source 12 of helium or some other dry gas selected from among the noble gases. Reference is made to the said copending application of deBuhr for a fuller description of the method of periodically pulsing a drying chamber with a dry inert gas.

A Roots blower 16, or other high speed rotary blower, is provided for circulating gas between the drying chambers A and B in the manner to be described below. The blower operates in only one direction and is connected to the chambers A and B via their respective condensers and the valve system 20. The valve system comprises a first valve 21 controlling inlet flow from condenser A, a second valve 22 controlling outlet flow to condenser B, a third valve 23 controlling outlet flow to condenser A and a fourth valve 24 controlling inlet flow from condenser B. The valves are actuated by air operated servomechanisms controlled by automatic controller 18 which sequences the operation of these four valves.

The controller 18 also controls valves 14A and 14B in response to signals received from pressure gauges 26 and 28.

Referring now to FIG. 2, the operation of the apparatus is shown on a pressure-time trace. The variation of total presure in chamber A is shown by the solid curve A and the variation of total pressure in chamber B is shown by the dashed curve B. Initially both chambers are at atmospheric pressure, blower 16 is idle and valves 21–24 are closed. Valves 14A and 14B are open and operation of pump 10 begins. This pulls the pressure in both chambers down to point 1 which is on the order of about one mm. Hg, abs. Then helium is admitted to dryer A and valve 14A is closed under manual control. Meanwhile control 18 is switched on so that further operations are automatically controlled. The total pressure in chamber A rises until a pressure indicated at point 2 in excess of 4 mm. Hg, and preferably 8 mm. Hg, is reached. Then pressure gauge 26 signals controller 18 to partially open valve 14A to prevent any further rise. In general, it will not be necessary for such a signal to be transmitted to controller 18 since a limited amount of helium is used to charge the dryer A. The primary cause of pressure rising above point 2 will be excessive evolution of water vapor from the frozen product. This pressure is maintained for a limited time which may vary from as low as 30 seconds to as high as 30 minutes, depending on the nature of the frozen product and the equipment selected. At point 3 representing the end of this limited time, controller 18 shuts valve 14B and opens valves 21 and 22. The high speed blower 16 removes gas from chamber A to chamber B rapidly via the condensers.

The routing of the gas via the condensers assures the removal of a substantial portion of water vapor so that the greater portion of gas shuttled from one chamber to the other is helium. Thus the total pressure in chamber B is rapidly raised to that at point 4 by the addition of dry gas while the total pressure in chamber A is correspondingly decreased to that at point 5. At point 4–5 of time, valves 21 and 22 are closed and the elevated pressure is maintained in chamber B. Overpressure surges, if any, are eliminated by valve 14A or 14B in response to signals from gauges 26 or 28, respectively.

The alternate pulsing of chambers A and B is continued in cyclic fashion throughout the drying cycle. It will now be appreciated that the helium is conserved by this technique. At intermittent times a little helium should be added to chamber A to make up for losses due to intermittent opening of valves 14A and 14B due to overpressure surges detected at one of the pressure gauges 26 or 28.

Certain changes may be made in the above apparatus without departing from the scope of the invention herein involved. For instance, the valves 14A and 14B need not be cracked and overpressure need not be measured if the pulses are very short, as on the order of one minute. The valves 22 and 23 may be rearranged to feed gas directly from the blower 16 to chambers B and A, respectively. This would eliminate a minor impedance to water vapor flow from the chambers to their respective condensers. Therefore, it is intended that all matter contained in the above description, or shown in the accompanying drawings, shall be interpreted as illustrative, and not in a limiting sense.

What is claimed is:

1. A freeze drying apparatus comprising first and second freeze drying chambers, vacuum pump means operatively connected to the chambers to maintain low pressures in both chambers at the same time, condenser means operatively connected to the chambers to maintain a low equilibrium partial pressure of water vapor, and means for circulating inert gas back and forth between the chambers a multiplicity of times without opening the chamber to the atmosphere, said apparatus comprising a charge of dry inert gas.

2. A freeze drying apparatus comprising first and second freeze drying chambers, vacuum pumping means, first and second passage means connecting said first and second chambers respectively to said vacuum pumping means, first and second condenser means connected in advance of said vacuum pumping means to said first and second passage means respectively, and means for circulating inert gas between said chambers a multiplicity of times without opening the chamber to the atmosphere via at least one of said condensers, said apparatus comprising a charge of dry inert gas.

3. The apparatus of claim 2 wherein said circulating means comprises a high speed rotary blower.

4. The apparatus of claim 3 wherein said circulating means comprises a high speed one-way blower with inlet and exit plumbing connected to each of said first and second condenser means.

5. The apparatus of claim 2 further comprising automatic control means connected to the circulating means to provide for removal of gas from the first chamber to the second chamber at a first set of spaced intervals and the return of gas from the second condenser to the first condenser at a second set of stepped intervals alternating with said first set.

6. The apparatus of claim 2 wherein said vacuum pumping means comprises isolating valve means for cutting off said first and second passage means.

7. The apparatus of claim 6 further comprising means for opening said isolating valve means in response to an overpressure condition in either drying chamber.

8. In a freeze drying system of the type comprising a drying chamber connected to a vacuum pump and a condenser wherein a dry inert gas is charged into the system, the improvement comprising: a rotary blower connected to said system via passage means for periodically removing gas from the system to a second point of use and periodically restoring the gas to the system, and means for limiting the effectiveness of the vacuum pumping system in conjunction with the operation of the blower.

9. The improved freeze drying system of claim 8 wherein the passage means are connected to the condenser of the freeze drying system.

10. The improved freeze drying system of claim 8 wherein the blower operates in one direction only and the passage means comprises a first blower valve controlling inlet from the freeze drying system, a second blower valve controlling outlet to the second point of use, a third blower valve controlling the outlet to the freeze drying system, a fourth blower valve controlling the outlet to the second point of use and timer means for opening the first and fourth valve while closing the second and third valves at a first set of periodic intervals and opening the second and third valves while closing the first and fourth valves at a second set of periodic intervals alternating with said first set of intervals.

11. The improved freeze drying system of claim 8 wherein the dry inert gas is one of the noble gases.

12. The improved freeze drying system of claim 11 wherein the dry inert gas is helium.

13. The improved freeze drying system of claim 11 wherein the inert dry gas is hydrogen.

References Cited by the Examiner

UNITED STATES PATENTS

| 1,799,248 | 4/1931 | Reinhardt | 34—15 |
| 2,380,339 | 7/1945 | Seidentopf | 34—5 |
| 2,477,959 | 8/1949 | Brown | 34—15 |
| 2,480,146 | 8/1949 | Lee | 34—5 X |
| 2,574,298 | 11/1951 | Smith | 34—92 |
| 2,621,492 | 12/1952 | Beardsley et al. | 34—5 |
| 2,994,132 | 8/1961 | Neumann | 34—92 |

WILLIAM J. WYE, *Primary Examiner.*

NORMAN YUDKOFF, *Examiner.*

F. E. DRUMMOND, *Assistant Examiner.*